(No Model.) 8 Sheets—Sheet 2.

A. G. & H. EDMUND.
STONE CUTTING OR CARVING MACHINE.

No. 591,114. Patented Oct. 5, 1897.

Witnesses.
G. M. Anderson
Phill. Masi

Inventors
A. G. Edmund
Hannah Edmund
by E. W. Anderson
their Attorney.

(No Model.)  A. G. & H. EDMUND.  8 Sheets—Sheet 4.
STONE CUTTING OR CARVING MACHINE.

No. 591,114. Patented Oct. 5, 1897.

Witnesses.
G. M. Anderson
Phille. Masi.

Inventors
A. G. Edmund
Hannah Edmund
E. W. Anderson
their Attorney.

(No Model.) 8 Sheets—Sheet 5.
A. G. & H. EDMUND.
STONE CUTTING OR CARVING MACHINE.
No. 591,114. Patented Oct. 5, 1897.
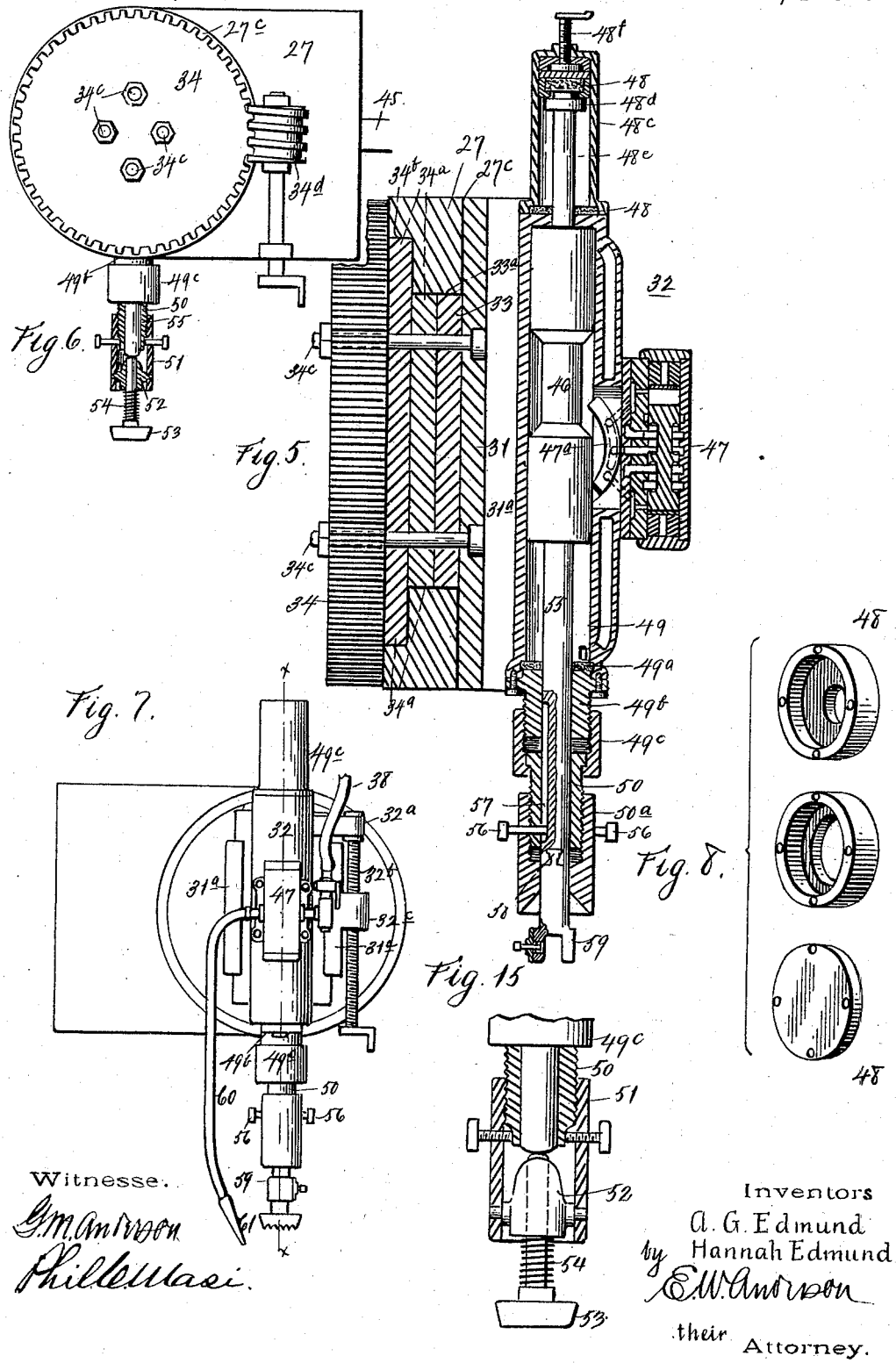
Witnesses.
G. M. Anderson
Phille Masi
Inventors
A. G. Edmund
Hannah Edmund
by E. W. Anderson
their Attorney.
THE NORRIS PETERS CO., PHOTO-LITHO., WASHINGTON, D. C.

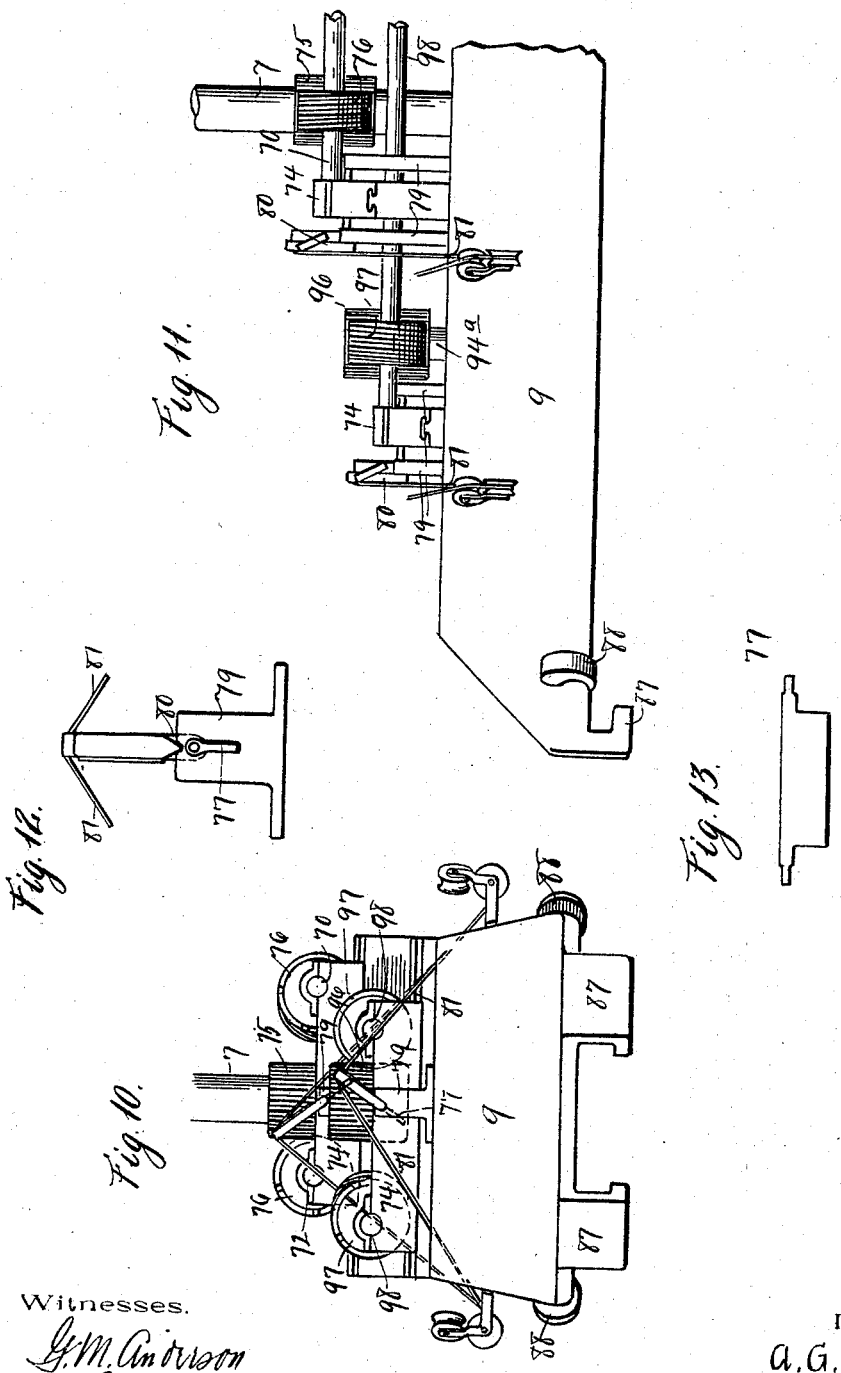

(No Model.) 8 Sheets—Sheet 7.

A. G. & H. EDMUND.
STONE CUTTING OR CARVING MACHINE.

No. 591,114. Patented Oct. 5, 1897.

Witnesses.
GM Anderson
Phil C Masi

Inventors
A. G. Edmund
Hannah Edmund
by E.W. Anderson
their Attorney.

(No Model.)   8 Sheets—Sheet 8.
A. G. & H. EDMUND.
STONE CUTTING OR CARVING MACHINE.
No. 591,114.   Patented Oct. 5, 1897.
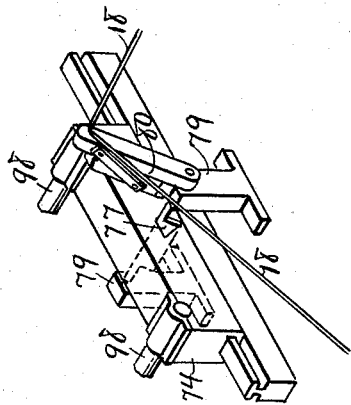
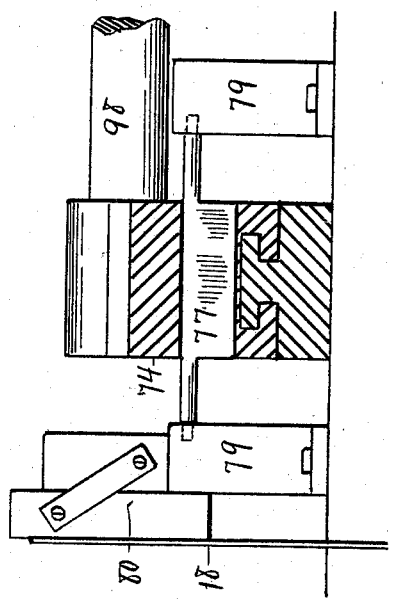
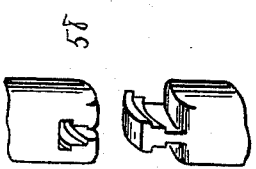
Witnesses.
G. M. Anderson
Phill. Masi.
Inventors
A. G. Edmund,
Hannah Edmund.
by E. W. Anderson
their Attorney.

UNITED STATES PATENT OFFICE.

AUGUST GEORGE EDMUND AND HANNAH EDMUND, OF SEATTLE, WASHINGTON.

STONE CUTTING OR CARVING MACHINE.

SPECIFICATION forming part of Letters Patent No. 591,114, dated October 5, 1897.

Application filed June 2, 1896. Serial No. 593,997. (No model.)

*To all whom it may concern:*

Be it known that we, AUGUST GEORGE EDMUND and HANNAH EDMUND, citizens of the United States, and residents of Seattle, in the county of King and State of Washington, have invented certain new and useful Improvements in Stone Cutting or Carving Machines; and we do declare the following to be a full, clear, and exact description of the invention, such as will enable others skilled in the art to which it appertains to make and use the same, reference being had to the accompanying drawings, and to figures of reference marked thereon, which form a part of this specification.

Figure 1:
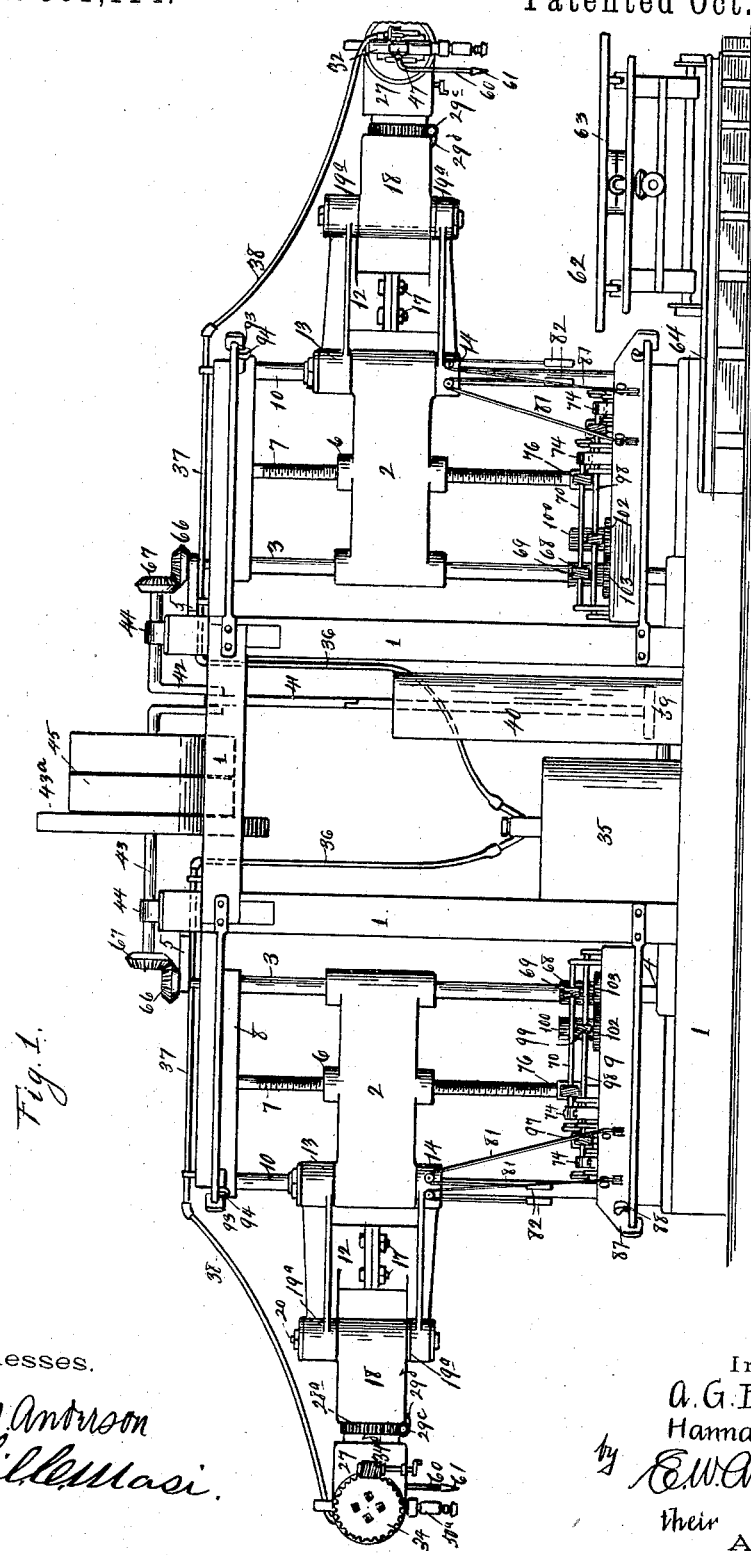
Figure 2:
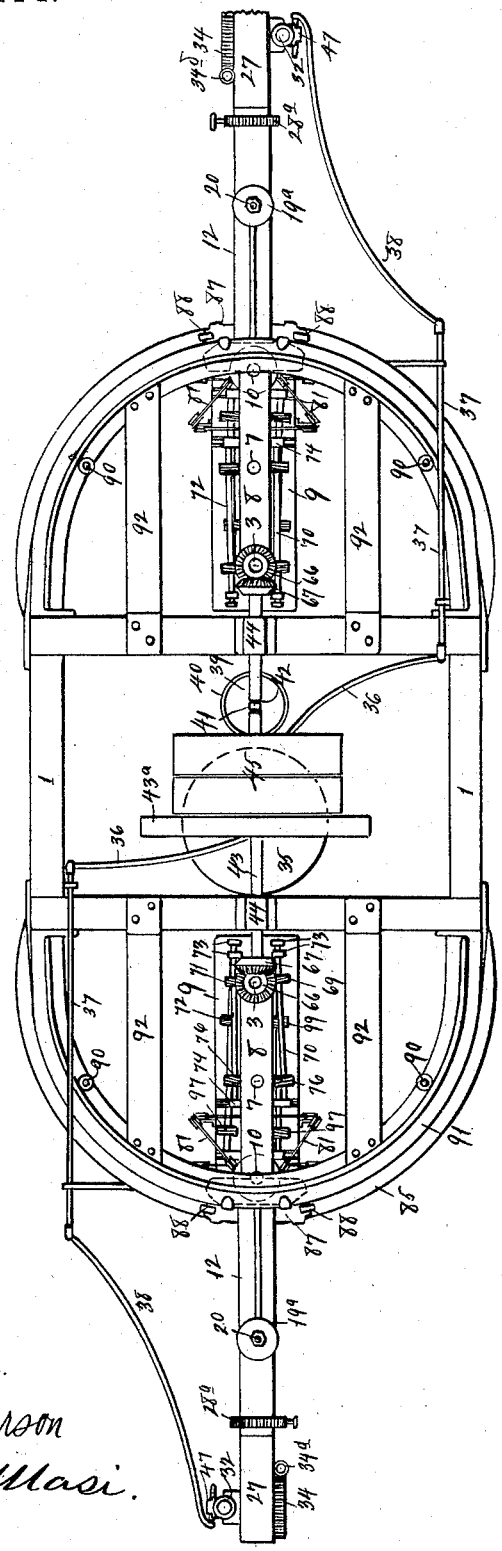
Figure 3:
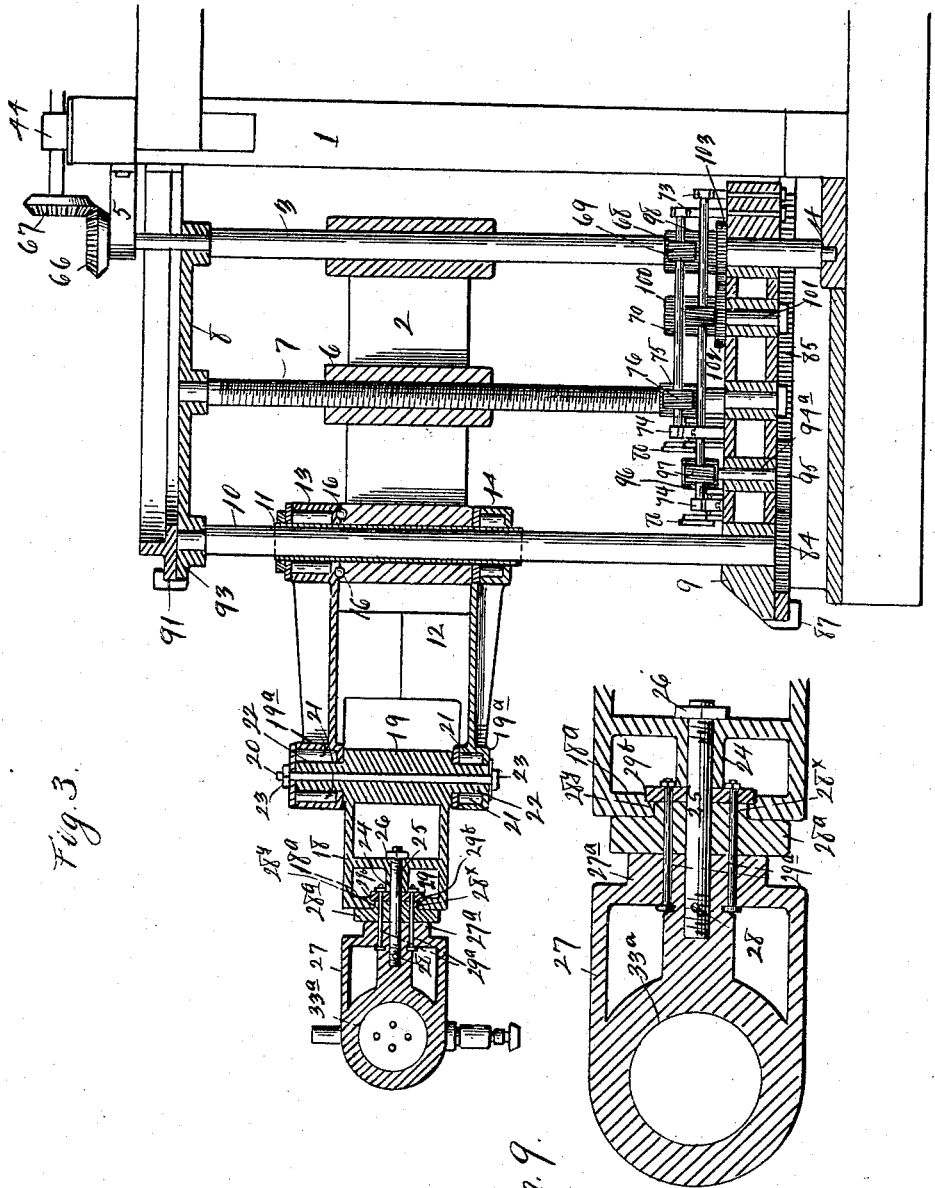
Figure 4:
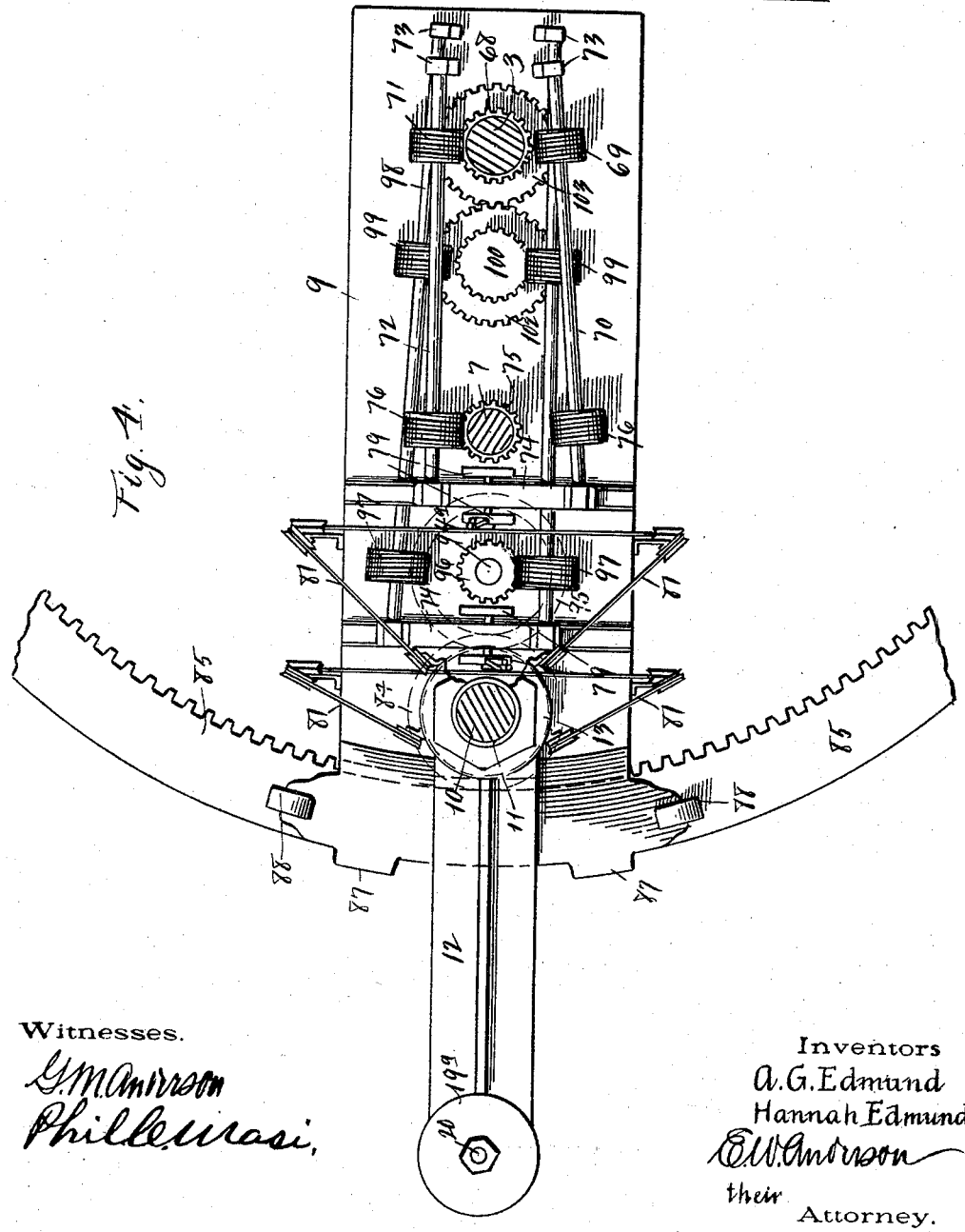
Figure 14:
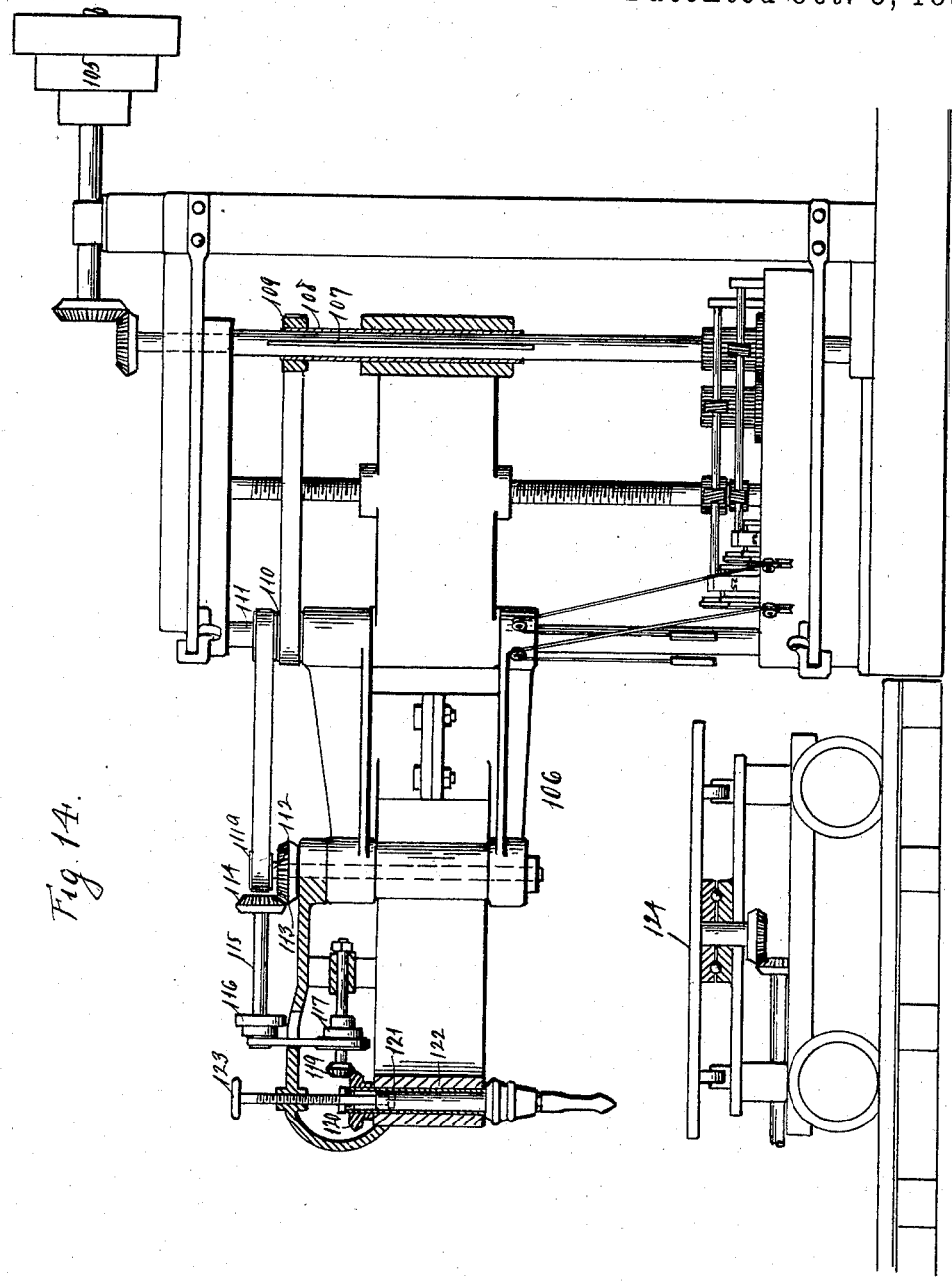

Figure 1 is a side elevation of the machine. Fig. 2 is a plan view of the same. Fig. 3 is a central vertical section through one-half of the machine. Fig. 4 is a plan view of the lower plate 9 with devices thereon, the middle section 12 and a portion of the rack being shown. Fig. 5 is a section on line $xx$, Fig. 7. Fig. 6 is a side view of end section 27 with rolling chuck and sleeves in section. Fig. 7 is a front view of the end section 27 and engine. Fig. 8 shows the perspective views of packings 48. Fig. 9 is an enlarged sectional view of the end section 27 and a portion of the middle section. Fig. 10 is a front view of the lower plate 9 and devices thereon at its forward portion. Fig. 11 is a side view of the same. Fig. 12 is a front view of the cam 77, lever 80, &c. Fig. 13 is a side view of the cam. Fig. 14 is a side view of the machine as adapted for boring, parts being in section. Fig. 15 is a detail sectional view of the tool and tool-holder shown in Fig. 6. Fig. 16 is a detail perspective view showing the joint in the piston-rod, the two sections being detached from each other. Fig. 17 is a detail perspective view showing the gear-shifting devices. Fig. 18 is an end view of the same, partly in section.

This invention has relation to a certain new and useful machine for stone cutting, carving, rubbing, polishing, drilling, boring, metal-engraving, and other shopwork, the object being to provide a machine capable of performing any of the above functions with perfect accuracy and niceness, and which shall be thoroughly practical in its construction and operation, the change from one function to another being for the most part accomplished by a simple interchange of tools.

With this object in view the invention consists in the novel construction and combination of parts, all as hereinafter described, and pointed out in the appended claims.

In the accompanying drawings we have illustrated the machine as it is usually constructed for stone-cutting, the cutting mechanism existing in duplicate upon opposite sides, and also as constructed for use for machine-work, wherein the mechanism at one side is somewhat modified.

The construction for stone-cutting illustrated in Figs. 1 to 11, inclusive, will first be described.

Referring to the drawings, the numeral 1 designates the main frame of the machine, from opposite sides of which extend the horizontal tool-arms, which carry the respective operating mechanisms. Inasmuch as the arrangement of both of these arms is the same and the mechanisms are duplicates the description will be generally confined to that at one side, similar reference-numerals being applied to corresponding parts upon both sides. Each arm has an inner section 2, which is loosely sleeved upon a vertical shaft 3, having a lower bearing-step 4 in the frame 1 and an upper bearing 5, above which the said shaft projects. Said arm-section also has an internally-threaded hub or sleeve 6, which engages a vertical screw-shaft 7, journaled in the upper and lower horizontal arms or plates 8 and 9, which are each loosely sleeved upon the shaft 3, and to which are secured the end portions of a third shaft 10, which is parallel with the shafts 3 and 7, but which is nonrotary. This shaft 10 has a sleeve 11, upon which the inner arm-section 2 is jointed to a middle section 12. To form this joint, the section 2 is sleeved upon the shaft 10, and the middle section is formed with an upper bearing 13, which loosely engages the shaft 10 above the section 2, and with a lower bearing 14, which engages said shaft below the section 2. The upper bearing 13 has antifriction-rollers 15 and a ball-bearing 16 upon the shoulder of the sleeve of section 2. The lower bearing 14 has roller-bearings only. The section 12 is cast in two plate-sections united by bolts or screws 17, as indicated.

18 indicates the third section of the arm, which is cast at its inner end with a hub 19, vertically bored to receive a rod or shaft 20, which forms the pivot of the joint which connects the sections 12 and 18. To make this joint, the section 12 is formed with upper and lower boxes $19^a$, provided with bearing-rollers 21, which work upon shoulders 22 of the boxes $19^a$ and against end extensions 22 thereof. Both ends of the rod or shaft 20 are provided with a cap 23, the upper one being screwed thereon. The outer end portion of the section 18 is bored out to form a horizontal socket 24, which receives one end portion of a shaft 25, which is threaded upon both end portions. The inner end portion of said shaft, which extends through this socket, is secured by a nut 26, which prevents the shaft withdrawing, but permits it to turn in the socket. The outer end portion of the shaft 25 enters a socket in a circle frame or casting 27, in which it is secured against turning, as by the pin 28.

$28^a$ is a worm gear-wheel which is fixed to the shaft 25 between the outer end plate $18^a$ of the section 18 and the inner end plate $27^a$ of the frame or casting 27. Said gear-wheel has a boss $28^x$, which turns in a bearing $28^y$ in the end plate $18^a$. 29 is a disk which is secured to the end of said boss by means of bolts $29^a$, which extend through said disk, boss, the worm gear-wheel, and the plate $27^a$, as shown in Figs. 3 and 9, for example. Said disk is fitted to rotate in a bearing $29^b$ on the inner face of the plate $18^a$.

$29^c$ is a small worm whose shaft $29^e$ is journaled in a bracket-bearing $29^d$ of the section 18. By turning this shaft it will be apparent that the entire frame or casting 27 will be rotated. At the outer end portion of the frame 27 is a circular seat $27^c$, in which is fitted a rotatable circular blank 31, upon the outer face of which are formed parallel guides or flanges $31^a$. Seated between these flanges is an engine 32, which actuates the tool or cutter. The case or cylinder-shell of this engine has a lug $32^a$, which is engaged by a screw-shaft $32^b$, having a threaded bearing at $32^c$ on said frame or casting 27. By actuating said shaft $32^b$ the engine may be moved up or down between the said flanges or guides. On the inner face of this blank 31 is a boss 33, which fits a circular opening $33^a$ in the seat $27^a$.

34 is a worm-wheel which turns upon the opposite side of the seat portion $27^a$ and whose inner face has a boss $34^a$ of two diameters, the smaller portion thereof fitting the opening $33^a$, while the larger portion fits a circular bearing $34^b$ of the part 27.

$34^c$ are bolts which rigidly secure together the blank 31 and the worm-wheels 34.

$34^d$ is a worm-shaft journaled in bearings of the frame 27 and engaging the worm 34. By actuating this shaft $34^d$ the blank 31, with its engine 32, may be rotated to direct the engine and tool at different angles.

From the foregoing it will appear that outside of the adjustment which it may have by different positions of the sections 2, 12, and 18 of the carrying-arm the engine has three other adjustments, as follows: first, an adjustment in a circular path concentric with the axis of the shaft 25; second, a vertical adjustment in the guides or flanges $31^a$, and, third, the adjustment due to the rotation of the blank 31 in a plane at right angles to the plane of the adjustment first mentioned. This engine is preferably operated by compressed air from a receiver 35 through a hose or pipe 36, pipe 37, and hose 38. The air is compressed into this receiver by a piston 39 in a cylinder 40, said piston being operated by a connection 41 with the crank 42 of a shaft 43, supported in bearings 44 on the upper central portion of the main frame and driven by a fast and loose pulley 45. The receiver and compressor are common to the engines of both arms.

46 designates the piston of the engine, which has a short stroke, (usually about two inches.)

47 is a valve-box, and $47^a$ is a valve which is preferably what is known as a "Sergant" auxiliary valve, and need not be specifically described, inasmuch as we make no claim specifically to the piston and its valve, which may be of any well-known or suitable character.

48 are packings which are placed within a packing-box $48^c$ at the upper end of the engine, and $48^d$ is a buffer on the tail-rod $48^e$ of the piston. This buffer contacts with the respective packings 48 at the limits of the stroke and prevents jar or breakage.

$48^f$ is an adjusting device by means of which the length of stroke may be varied.

49 is the lower cylinder-head, packed at $49^a$, and to an extension $49^b$ of which is screwed a sleeve $49^c$.

50 is a second sleeve whose upper flanged end is rotatably secured within the lower portion of the sleeve $49^c$.

$50^a$ is a sleeve which is secured upon sleeve 50; or in place of the sleeve $50^a$ we may employ a sleeve 51, (shown in Figs. 6 and 15,) or such other forms may be used as may be necessary with different tools. This sleeve 51 is provided at its lower portion with a rolling chuck 52 to receive a tool 53, such tool to have a steel-wire spring 54 coiled around its shank, one end of such spring being fastened to the tool and the other to the chuck. The extension of the piston-rod 55 forms a hammer which plays upon the tool, the latter while cutting always resting upon the stone or material operated upon. The spring throws the tool back out of the stone. The rolling chuck prevents the tool from going straight into the work. The sleeve 50 is provided with handles 56, by means of which it may be turned to set the tool at different angles without stopping the machine, one of said handles having an extension through the sleeve into engagement with a groove of the piston-rod, as indicated at 57, for this purpose.

The piston-rod 55 is usually knuckle-jointed, as indicated at 58, this joint being of especial importance when such a sleeve as that indicated by 50ª, Fig. 5, is used. This sleeve has an inside bevel, the lower end of its opening being largest. With this form of sleeve the lower section of the piston-rod will be provided with a tool-holding chuck 59 and will be interchangeable. When operating upon the stone with this kind of tool and sleeve, the joint in the piston-rod is very useful, the operation being as follows: Toward the end of the stroke the joint in the piston gets down where the sleeve opens out, and the rod forms a knee, causing the tool to throw upwardly out of the stone. A hose 60 is attached to the exhaust of the engine and terminates adjacent to the tool with a nozzle 61, the discharge of air from which will blow away the dust and chips. The stone is placed upon a car, such as indicated at 62, having a turn-table 63 and running upon a circular track 64. When a small stone is to be cut, it is clamped to the car and the car to the track. When the stone is cut, the car can be run around on the circular track and the stone ground or polished while another car is run under the engine. The shaft 43 may have a pulley 43ª, from which a belt is carried to run a polishing-wheel.

In addition to the movement afforded the arm by reason of its various joints above described it is also capable of swinging bodily from the shaft 3 as a center and of a vertical adjustment on the shafts 3, 7, and 10. The mechanism by means of which these movements are produced will now be described.

Fast on the upper extension of the shaft 3 is a bevel gear-wheel 66, which meshes with a corresponding gear 67 on the shaft 43. On the lower end portion of said shaft is a worm-wheel 68, which is arranged to gear at one side into a worm 69 on a horizontal shaft 70, running at right angles to the shaft 3, and at the opposite side into a similar worm 71 on a shaft 72, parallel with the shaft 70. These shafts are journaled at one end in pivoted bearings 73 on the lower plate or arm 9, before referred to as being sleeved on the shaft 3, from which it is arranged to swing, and at the opposite end portions in a box 74, which is capable of a sliding movement on said arm or plate. On the lower portion of the screw-shaft 7 is a worm-wheel 75, and the shafts 70 and 72 each carry a worm-wheel 76, which can be brought into engagement with said worm. Set into the upper central portion of said sliding box is a cam or eccentric 77, carried by a rocking rod or shaft journaled in boxes 79 upon each side of the box 74. On one end of this rod is a crank or lever 80, having a spring rod or pawl adapted to engage teeth or notches in one of the boxes 79. Attached to this lever or crank are two cords or cables 81, which extend over suitably-arranged guide-pulleys, their free ends being each provided with a weight 82 to take up the slack. By pulling either of these cords the pawl will be released and the eccentric operated to move the sliding box to bring one or the other of the worms 76 into or out of engagement with the worm of the screw-shaft 7, or both worms may be held out of engagement with the screw-shaft. It will be apparent that when one of the worms 76 is in gear the screw-shaft 7 will be turned in one direction, and in the opposite direction when the other of said worms is in gear therewith, and that according to the direction of this movement the said screw-shaft will operate to either raise or lower the tool-carrying arm.

On the lower end portion of the shaft 10 is a loose gear-wheel 84, which is arranged to gear in a semicircular rack 85, which is bolted to the frame 1 from the outside, as indicated at 86, and whose circumference is described from the shaft 3 as a center. As this gear-wheel runs around the rack 84 the entire tool-carrying arm will be swung from the shaft 3.

The lower plate or arm 9 at its outer end has a frog 87, having two lips which loosely embrace the outer edge of the semicircular rack 85, as indicated. This frog has two rollers 88, which travel on the upper surface of the circle. The circle is also provided with seats 90 for bolts or rods designed to extend down into and through the machine bed or foundation. An upper semicircle 91 is also provided, which is securely bolted to the outside of the frame 1 and which is further supported by beams 92, bolted to the main frame and to the circle. The upper arm 9 is provided with a frog 93, similar to frog 87 and which carries rollers 94, which travel on the under surface of the circle 91. The frogs 87 and 93 are for the purpose of preventing vibration.

The arrangement for moving the tool-arm along the circle is as follows: The arm or plate 9 has journaled therein a short vertical shaft 94ª, upon the lower portion of which is a gear-wheel 95, which meshes with the loose gear-wheel 84 of the shaft 10. On the upper portion of said shaft is a worm-wheel 96, at opposite sides of which are two worms 97, carried each by its own shaft 98, such shafts being parallel with and below the respective shafts 70 and 72 before described. Each of said shafts 98 at its opposite end portion carries a worm 99, which worms are arranged to engage opposite sides of a worm-wheel 100 on the upper portion of a short vertical shaft 101, journaled in the arm 9 between the shafts 3 and 7. On the lower portion of the shaft 101 is a gear-wheel 102, which is driven by a gear 103 on the shaft 3. The shafts 98 are journaled in the same manner as the shafts 70 and 72, and their sliding box is operated by a similar arrangement of eccentric and cords 104, as clearly shown, the object being to provide means whereby either one of the worms 97 may be thrown into engagement with the worm-wheel 96 to actuate the gears 95 and 84 in the direction to produce the desired movement of the tool-carrying arm.

It will be apparent that the various combinations of adjustments permitted the tool by the construction of its tool-carrying arm enables the said tool to be perfectly and accurately guided to any point of the work and at any angle thereto. In the hands of a skilled operator the machine is capable of executing work of intricate and difficult character—such as the carving of designs of any form upon the stone or metal—the use of various forms of tool being permitted. It is intended to construct the machine of any desired size, according to the special character of the work for which it is designed.

The reciprocating engine above described may be removed from the arm and a rotary engine placed therein. The tool-holder for such an engine can be provided with a drill or auger for boiler-riveting or other work, or the tool may be replaced by an emery-stone or other rubbing or polishing tool for either stone or metal.

The modified form of machine shown in Fig. 12 will now be described, this form having one of its arms provided with mechanism to adapt the machine for use as a boring-mill or drilling-press. In this form the fast and loose pulleys on the shaft 43 are exchanged for an ordinary step-pulley 105.

The tool-arm 106 is similar to the construction first described, with the exception of the third section thereof, which in the present case forms the tool-carrier and terminates the arm. The roller and ball bearings at the joints may also be omitted. The shaft 3 is formed with a longitudinal keyway 107, which fits a key on the sleeve 108 thereof. On the upper portion of said sleeve is a pulley 109, which is belted to a flanged twin pulley 110 on the shaft 111, and which is in turn belted to a pulley 111ª on the shaft 112, which forms the pivot of the joint between the second and third sections of the arm. (The shafts 111 and 112 correspond, respectively, to the shafts 10 and 20 of the construction first described.) On the shaft 112 is a bevel-gear 113, which drives a similar gear 114 on a shaft 115, journaled horizontally in boxes on the outer section of the arm. On the opposite end portion of said pulley is a step-pulley 116, which is belted to a similar pulley 117 on a parallel shaft 118, journaled lower down on the arm, and which carries a bevel-gear 119, meshing with a similar gear-wheel 120 on the sleeve of the rotary drill 121, which works in a socket 122 at the extremity of the arm.

123 designates a hand-feed for the drill, the main feed being from the screw-shaft 7. The gear for raising and lowering the arm by means of this shaft and for swinging the arm on the shaft 2 is similar to that in the construction first described.

If desired, the outer extremity of the arm may be rigged up in the manner of an ordinary drill-press.

In place of the belt-gear described sprocket-gear may be employed.

When used as a boring-mill, a turn-table 124 is usually provided underneath the tool, as indicated, or in front of the arm, which can be moved back and forth on a suitable track. The joints of the arm have to be stiffened for such use by suitable means, such as removable bolt-rods (not shown) running from the inner to the outer section of the arm.

We do not wish to limit ourselves to the exact construction and combination of parts as herein shown and described, as the same may be varied without departing from the spirit and scope of our invention.

Having thus described our invention, what we claim as new, and desire to secure by Letters Patent, is—

1. In a machine of the character described, the combination with a main frame having a stationary segmental rack, a vertical rotary shaft journaled in the said frame, a secondary frame mounted to swing on the said shaft, a screw-shaft journaled in said secondary frame, gear whereby said screw-shaft may be rotated in both directions, a gear-wheel carried by the said secondary frame and engaging the said rack, means whereby said gear-wheel may be rotated in both directions, a jointed arm loosely sleeved on said rotary shaft and having a hub portion which engages the said screw-shaft, and a tool-operating engine mounted upon the outer section of the said arm and capable of a universal adjustment, substantially as specified.

2. In a machine for stone-cutting and other purposes, the combination with a main frame, and the vertical rotary shaft 3, of a jointed tool-carrying arm loosely sleeved on said shaft, arms 8 and 9 also loosely sleeved on said shaft, the screw-shaft 7 journaled in said arms and engaging a threaded sleeve or hub of the tool-arm, gear for rotating said screw-shaft in either direction, the non-rotary shaft 10 carried by the arms 8 and 9 and upon which the tool-arm is also sleeved, the gear-wheel on the lower portion of said shaft 10, the semicircular rack in which said gear-wheel travels, means for rotating said gear-wheel in either direction and the upper semicircular guide-frame, substantially as specified.

3. In a machine for stone-cutting and other purposes, the combination of the main frame, the upper and lower semicircular frames or castings bolted thereto, the lower of said frames or castings having a rack, the vertical rotary shaft 3 journaled in said frame, driving-gear for said shaft, the upper and lower arms 8 and 9 swung from said shaft and having each a frog at its outer portion engaging and traveling upon the respective frames or castings, the screw-shaft 7 journaled in said arms 8 and 9, the non-rotary shaft supported by said arms, the gear-wheel thereon running in the rack of the lower frame or casting, gear for rotating said gear-wheel in either direction, and a tool-arm loosely sleeved on the shafts 3 and 10 and having a threaded engagement with the screw-shaft 7, substantially as specified.

4. In a machine for stone-cutting and other purposes, the combination with the tool-arm, the swinging arms 8 and 9, the shafts 3, 7 and 10, the semicircular rack, and the gear-wheel on the shaft 10 engaging said rack, of worm-gear driven from the shaft 3 and arranged to drive the said gear-wheel in either direction, substantially as specified.

5. In a machine for stone-cutting and other purposes, the engine having a jointed piston-rod the lower section of which forms a hammer-head for the tool, and the interiorly-beveled sleeve in which said section works, substantially as specified.

6. In a machine for stone-cutting and other purposes, the combination with the tool-arm, of the casting 27 rotatably jointed to said arm, the worm-wheel rotatably seated on said casting, a blank or casting bolted to said worm-wheel and having a seat for a tool-operating engine, a worm in engagement with said wheel, an engine seated in said casting and having a reciprocating piston and hammer-rod, a tool-holding sleeve on said engine, and a handle on said sleeve engaging the groove in the piston-rod, substantially as specified.

7. In a machine of the character described, the combination with a main frame, a vertical rotary shaft journaled therein, a pair of arms loosely sleeved on said shaft one above the other, a jointed tool-arm also loosely sleeved on said shaft, a screw-shaft journaled in said pair of arms and engaging a threaded hub of the tool-arm, gear for rotating said screw-shaft in either direction, a gear-wheel mounted on one of the said pair of arms and engaging a stationary semicircular rack on the frame, and means for rotating said gear-wheel in both directions, substantially as specified.

In testimony whereof we affix our signatures in presence of two witnesses.

AUGUST GEORGE EDMUND.
HANNAH EDMUND.

Witnesses:
I. MAITLAND,
R. H. BENNETT.